US010605315B2

United States Patent
Esnee et al.

(10) Patent No.: US 10,605,315 B2
(45) Date of Patent: Mar. 31, 2020

(54) ELECTROCHEMICAL DISC BRAKE WITH FIXED CALIPER COMPROMISING A TRANSMISSION COMPENSATING ASYMMETRIC WEAR OF THE PADS THEREOF

(71) Applicant: FOUNDATION BRAKES FRANCE, Drancy (FR)

(72) Inventors: Didier Esnee, Le Mans (FR); Thierry Pasquet, Vincennes (FR); Pascal Champion, Avrille (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 23 days.

(21) Appl. No.: 16/063,477

(22) PCT Filed: Dec. 19, 2016

(86) PCT No.: PCT/EP2016/081661
§ 371 (c)(1),
(2) Date: Jun. 18, 2018

(87) PCT Pub. No.: WO2017/108658
PCT Pub. Date: Jun. 29, 2017

(65) Prior Publication Data
US 2019/0003535 A1  Jan. 3, 2019

(30) Foreign Application Priority Data
Dec. 21, 2015  (FR) ...................................... 15 62940

(51) Int. Cl.
*F16D 55/225* (2006.01)
*F16D 65/18* (2006.01)
(Continued)

(52) U.S. Cl.
CPC ......... *F16D 55/225* (2013.01); *F16D 65/183* (2013.01); *F16D 2121/24* (2013.01); *F16D 2125/20* (2013.01); *F16D 2125/42* (2013.01)

(58) Field of Classification Search
CPC .. F16D 55/225; F16D 55/228; F16D 2121/24; F16D 65/183; F16D 2125/52; F16D 2125/42; F16D 2125/20
(Continued)

(56) References Cited

U.S. PATENT DOCUMENTS 4,852,699 A * 8/1989 Karnopp ............... B60T 13/741
188/72.2
2015/0354645 A1  12/2015 Cann
(Continued)

FOREIGN PATENT DOCUMENTS

FR  2 837 548 A1  9/2003
JP  1168392  * 11/1989

OTHER PUBLICATIONS

International Search Report dated Mar. 17, 2017 in PCT/EP2016/081661 filed Dec. 19, 2016.
(Continued)

*Primary Examiner* — Pamela Rodriguez
(74) *Attorney, Agent, or Firm* — Oblon, McClelland, Maier & Neustadt, L.L.P.

(57) ABSTRACT

A brake includes a caliper overlapping a disk. The brake also includes a first pad and a second pad which are carried by the caliper on either side of the disk. The brake further includes a first actuator including a first primary toothed wheel driving a first mobile piston pressing against the first pad in order to move same. The brake further includes a second actuator including a second primary toothed wheel driving a second mobile piston pressing against the second pad. The brake further includes a rotating shaft including a first and a
(Continued)

second endless screw having opposite winding directions, the shaft being movable in translation. The brake further includes an electric motor for driving the rotating shaft. The first and second endless screws are engaged in the first and second primary toothed wheels respectively.

5 Claims, 2 Drawing Sheets

(51) Int. Cl.
  *F16D 121/24*  (2012.01)
  *F16D 125/42*  (2012.01)
  *F16D 125/20*  (2012.01)
(58) Field of Classification Search
  USPC .................... 188/72.1, 72.2, 72.5, 72.6, 158
  See application file for complete search history.

(56) References Cited

U.S. PATENT DOCUMENTS

| 2018/0372177 | A1* | 12/2018 | Esnee | F16D 55/225 |
| 2019/0063527 | A1* | 2/2019 | Thomas | F16D 65/568 |
| 2019/0219117 | A1* | 7/2019 | Choi | B60T 13/741 |

OTHER PUBLICATIONS

French Preliminary Search Report dated Aug. 11, 2016 in Patent Application No. 15 62940 filed Dec. 21, 2015.

* cited by examiner

ELECTROCHEMICAL DISC BRAKE WITH FIXED CALIPER COMPROMISING A TRANSMISSION COMPENSATING ASYMMETRIC WEAR OF THE PADS THEREOF

TECHNICAL FIELD

The invention relates to a disc brake of an automobile vehicle with a fixed caliper of the electromechanical type, that is equipped with an electric motor driving mechanical actuators.

STATE OF PRIOR ART

More particularly, the invention relates to a disc brake including a braking disc overlapped by a fixed caliper carrying a pair of friction pads each facing a disc face, at least two mechanical actuators carried by the caliper and each including a movable piston and a driving member connected to the piston by a helical connection each to move a plate in order to press it against the disc, as well as an electric motor and a mechanism for transmitting to the driving members to move the driving members of both mechanical actuators.

In a disc brake with a hydraulic type fixed caliper, the hydraulic actuators located on either side of the disc each press a pad against the disc when the hydraulic circuit is pressurised, in order to generate a braking force.

Over time, the pads which are opposite to each other and on either side of the disc are differently worn, such that their thicknesses become different.

In the case of a hydraulic caliper, the thickness difference of the pads is compensated for by the fact that both actuators are connected to a same hydraulic circuit. With such a circuit, the operation corresponds to that of a force control, which hence enables that the pistons of the actuators have strokes with different lengths and/or different base positions with respect to the caliper.

Concretely, upon braking, the pressurising of the hydraulic circuit, and hence of the hydraulic actuators, moves the pistons of these actuators to the disc depending on the strokes that can be different or from different base positions. This movement is operated until the pistons press the pads against the disc, the pressure remaining identical in the circuit and in the actuators in any circumstance.

As a result with a hydraulic caliper, an asymmetric wear compensation of the pads is naturally made: irrespective of the thicknesses of the pads, both are necessarily pressed against the braking disc as soon as the hydraulic circuit is pressurised.

With an electromechanical type caliper, it is a same motor which drives both electromechanical actuators, through a transmission mechanism, such that they move the disc pistons closer to each other in order to press the pads on the disc to achieve braking effect.

If the mechanism ensures a direct type transmission, the movements and base positions of both pistons are necessarily the same when the motor drives the actuators. A thickness deviation of the pads resulting from an asymmetric wear could thereby not be compensated for, because the pistons driven by the motor are necessarily moved by the same stroke when the motor is supplied.

The purpose of the invention is to provide a mechanical transmission architecture ensuring an asymmetric wear compensation in a brake having a caliper comprising two mechanical actuators driven by a same electric motor.

DISCLOSURE OF THE INVENTION

To that end, the invention relates to a brake caliper of an automobile vehicle for overlapping an outer edge of a braking disc, this caliper comprising a first pad and a second pad for being on either side of the disc to be pressed against this disc, as well as:
- a first mechanical actuator including a first movable piston and a first primary toothed wheel, the first piston resting on the first pad to press it against the disc by rotating the first primary toothed wheel;
- a second mechanical actuator including a second movable piston and a second primary toothed wheel, the second piston resting on the second pad to press it against the disc by rotating the second primary toothed wheel;
- a rotary shaft including a first worm gear and a second worm gear having a winding direction opposite to that of the first worm gear, the driving shaft being translationally movable along its own longitudinal direction;
- an electric motor for driving the rotary shaft;
- and wherein the first worm gear is meshed in the first primary toothed wheel, and the second worm gear is meshed in the second primary toothed wheel.

With this arrangement, when one of the pads comes to contact the disc, the primary wheel of the corresponding actuator becomes stationary, but the rotary shaft continues to rotate by being translated to move the actuator of the other pad until it comes in contact with the disc. The mechanism thus compensates for any asymmetric wear of the pads by ensuring that the two pads with different thicknesses both rest on the disc when the rotary shaft is moved.

The invention also relates to a caliper thus defined, wherein the first and the second primary toothed wheel rotate about axes parallel to each other and perpendicular to the longitudinal direction of the rotary shaft.

The invention also relates to a caliper thus defined, wherein each actuator includes a driving toothed wheel connected to the corresponding piston by a helical connection, and a gear train through which the driving toothed wheel is movably connected to one of the worm gears of the rotary shaft.

The invention also relates to a caliper thus defined, wherein the gear train of each actuator includes the primary toothed wheel of this actuator as well as a secondary toothed wheel meshed in the primary toothed wheel and in oblique circumferential teeth of the driving toothed wheel.

The invention also relates to a brake for an automobile vehicle, comprising a caliper thus defined, as well as a braking disc.

DETAILED DISCLOSURE OF PARTICULAR EMBODIMENTS

Figure 1:
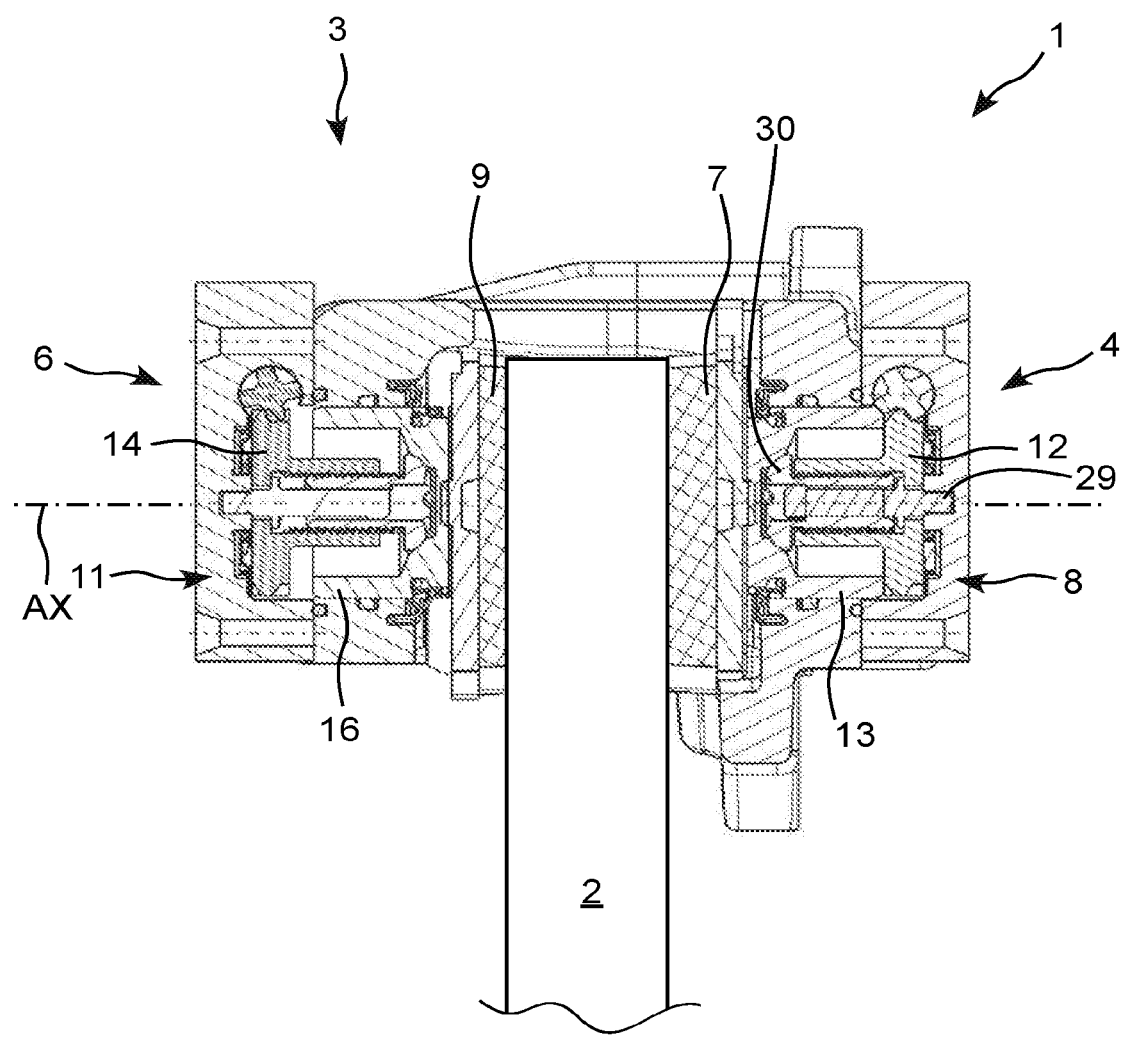
FIG. 1 is a transverse cross-section view of a brake according to the invention showing a disc portion and the caliper when the outer pad is more strongly worn than the inner pad.

The brake according to the invention which is marked as 1 in FIG. 1 includes a disc 2 overlapped by a caliper 3 which includes a first lateral portion 4 by which it is carried by a chassis element not represented, and a second side portion 6, located opposite to the first portion 4. The caliper overlaps the disc 2 such that this disc is sandwiched between its side portions 4 and 6.

The first portion 4 carries a first friction pad 7 as well as a first mechanical actuator 8 to press this pad against a face of the disc 2. Analogously, the second portion 6 carries a second friction pad 9, and a second mechanical actuator 11 to press this second pad against the disc, when the brake is controlled.

The first actuator 8 includes a driving member in the form of a toothed wheel 12 comprising a hub forming a nut in which a screw 29 is disposed, the end of which directed to the disc 2 carries a head, for example a conical head 30, resting on the bottom of the piston 13. The piston 13 is translationally movable along the axis AX, in a chamber or jacket of the first portion 4 of the caliper, by being rotatably blocked about this axis AX, for example by a radial stud.

When the wheel 12 is rotatably driven about the axis AX, it causes the piston 13 to be thereby moved along this axis, in either direction along the axis AX, along the direction of rotation of this wheel 12 about the axis AX.

In the same way, the second actuator 6 includes a driving toothed wheel 14 and a piston 16 along the axis AX, to move the piston 16 along the axis AX when the wheel 14 is rotated.

When the brake is new, both pads 7 and 9 have the same thickness, but these thicknesses become different, in view of the wear of these pads over time, which can be asymmetric. Thus, in the example of FIG. 1, the second pad, that is the pad 9 has a thickness much lower than the first pad, that is the pad 7.

Generally, the asymmetry in wear is not foreseeable, such that it is on the contrary the second pad 9 which has a thickness much higher than the first pad 7.

Figure 2:
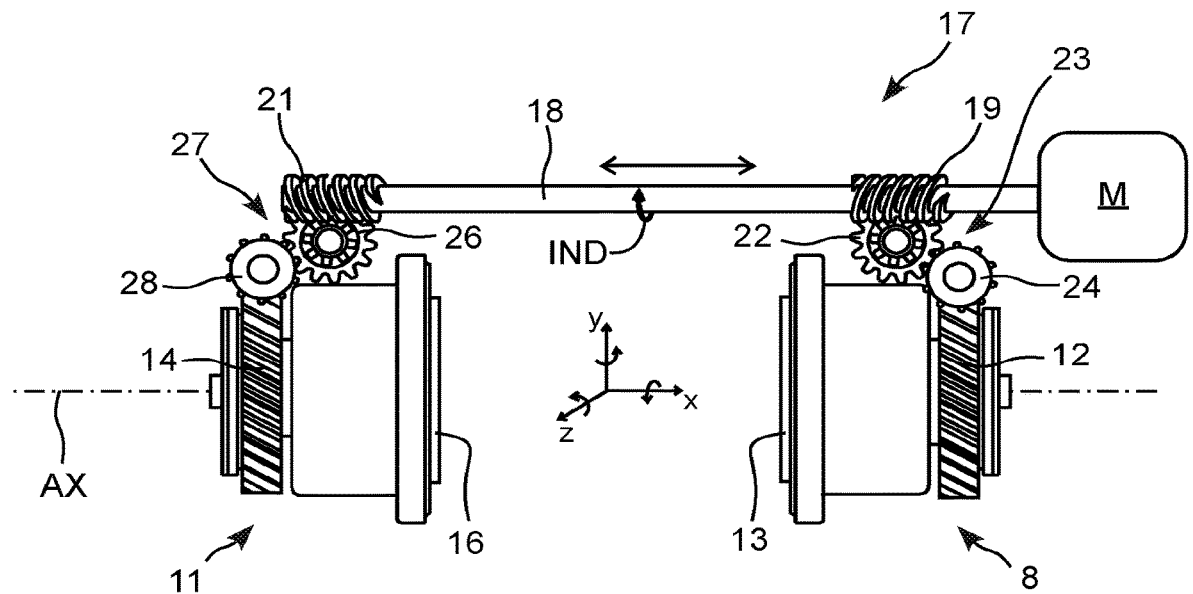
FIG. 2 is a front view of the mechanism according to the invention showing its transmission and its actuators when the brake is completely released.
Figure 3:
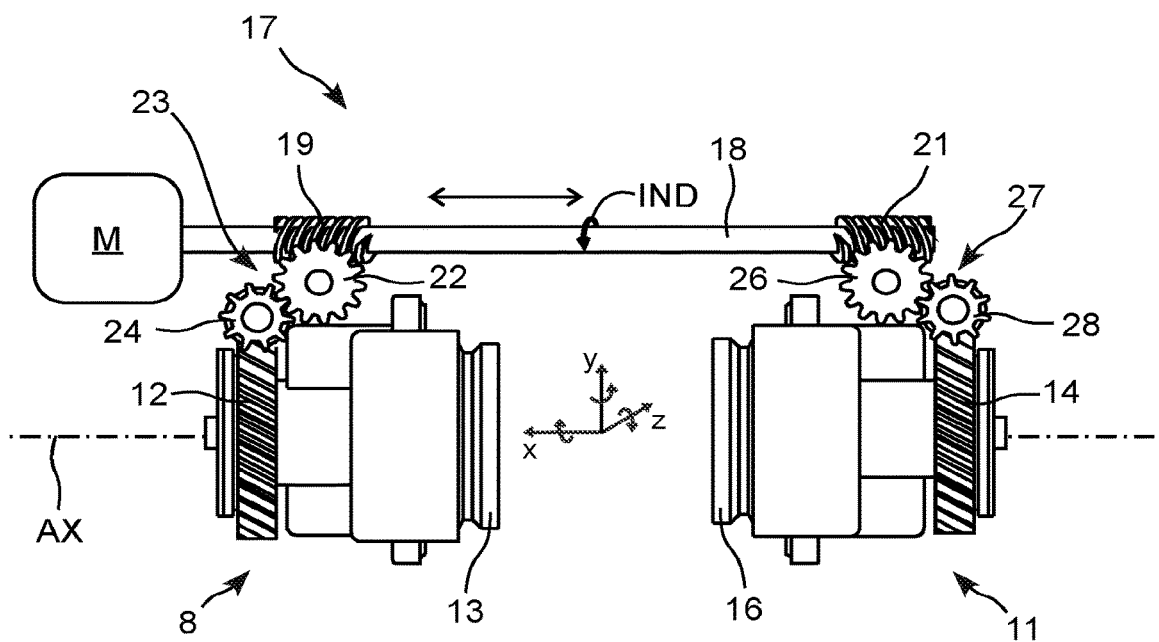
FIG. 3 is a rear view of the mechanism according to the invention showing its transmission and its actuators when the brake is applied.

The mechanical actuators 8 and 11 have their driving wheels 12, 14 which are rotatably driven by a same motor marked as M, through a transmission assembly marked as 17 in FIGS. 2 and 3.

The transmission assembly 17 includes on the one hand a driving shaft or axis 18, with an orientation parallel to the axis AX, and which is coupled to the motor M advantageously by a gear reducer not represented to be rotated by the same, while preserving a translation degree of freedom along the axis AX with respect to the motor and the frame of the brake caliper.

This shaft 18 carries a first worm gear 19 located at the first actuator 8 to rotatably drive the first driving wheel 12, and a second worm gear 21 located at the second actuator 11 to rotatably drive the second wheel 14, both these worm gears 19, 21 being rigidly integral with the shaft 18 carrying them.

The first worm gear 19 is engaged in a primary toothed wheel 22 of a first gear train 23 of the first actuator 8, this primary wheel 22 being itself meshed with a secondary toothed wheel 24 of this first gear train 23. This secondary wheel 24 is besides meshed with oblique teeth of the periphery of the first toothed wheel 12 of the first actuator 8.

In practice, when the shaft 18 rotates by being driven by the motor M, its first worm gear 19 rotatably drives the toothed wheel 12 through the first gear train 23 which makes up a gear reducer.

Analogously, the second worm gear 21 is engaged in another primary toothed wheel 26 of a second gear train 27 of the second actuator 11, which is itself meshed with another secondary toothed wheel 28 engaged in peripheral oblique teeth of the second toothed wheel 14.

Thus, when the shaft 18 rotates, its second worm gear 21 drives the second driving wheel 14 via the second gear train 27 which makes up another gear reducer.

As is visible in FIGS. 2 and 3, the axes of rotation of the shaft 18 and of the driving wheels 12 and 14 are parallel to the axis AX, whereas on the contrary, the axes of rotation of all the toothed wheels of the first and second gear trains are parallel to each other and perpendicular to the axis AX.

Besides, the threads of the first and of the second worm gears are in opposite directions. The first worm gear 19 is threaded in the backward direction, whereas the second screw 21 is threaded in the forward direction, such that a rotation of the shaft 18 in a first direction of rotation causes the actuators 8, 11 to move toward each other, whereas a rotation in a second direction of rotation causes the actuators 8, 11 to be diverted.

When the shaft 18 is rotatably driven in the reverse direction marked as IND in FIGS. 2 and 3, the first worm gear 19 drives the primary wheel 22 in the forward direction which itself drives the secondary wheel 24 in the reverse direction. The secondary wheel 24 thereby drives the second driving wheel 12 in the forward direction, which causes the piston 13 to come out.

As the second worm gear 21 has a thread in the reverse direction as that of the first gear 19, this same rotation of the shaft 18 in the reverse direction analogously causes a rotation of the second driving wheel 14 but in the reverse direction, this also causes the second piston to come out, because in particular these pistons are facing each other.

When the brake is controlled to press the pads on the disc, the pad carried by either of these pistons comes to rest on the braking disc before the other one, which makes the piston carrying it stationary, as well as the primary wheel of the gear train of this piston.

The shaft 18 continues to rotate, but the worm gear driving the piston carrying the pad which is already resting on the disc is meshed in the corresponding primary wheel which is blocked in position. Since this primary wheel is blocked, the rotation of the shaft 18 causes the simultaneous translation of this shaft along the direction of its length. Under these conditions, the piston carrying the pad which is not still in contact with the disc continues to come out under the effect of the rotation of the shaft 18 and of the worm gear associated with this piston.

Once the other pad comes to rest on the disc, the piston carrying it becomes stationary, and likewise, the primary wheel corresponding to the gear train driving this piston is blocked, such that the shaft 18 also becomes stationary because it is rotatably blocked by both primary wheels 22 and 26.

As is understood, the brake according to the invention naturally enables an asymmetric wear of both pads to be compensated for since it ensures that a first pad comes to rest to the disc, the other pad continues to be moved until it comes in turn to rest on the disc with the desired force. In the description above, the operation of the brake according to the invention has been explained in terms of movement of its components in order to facilitate comprehension thereof, with the proviso that in practice, the movements have reliable amplitudes and these are mainly forces which are transmitted by the different components.

In the description above, the rotary shaft drives two simple actuators located on either side of the disc, but an analogous system in which the rotary shaft drives two multiple actuators located on either side of the disc, and each including several movable pistons moved by as many driving wheels does not depart from the scope of the present invention.

Besides, in the example of the figures, each worm gear drives the driving wheel of the corresponding actuator through a primary wheel and a secondary wheel rotating about axes perpendicular to the axis of the shaft. Of course, a primary wheel with oblique teeth, meshed in the worm gear and in the driving wheel, this primary wheel with oblique teeth thereby rotating about an axis oriented 45° with respect to the rotary shaft does not depart from the scope of the present invention.

NOMENCLATURE

1: brake
2: disc
3: caliper
4: first portion
6: second portion
7: first pad
8: first actuator
9: second pad
11: second actuator
12: first driving wheel
13: first piston
14: second driving wheel
16: second piston
17: transmission assembly
18: driving shaft or axis
19: first worm gear
21: second worm gear
22: primary toothed wheel
23: first gear train
24: secondary toothed wheel
26: other primary toothed wheel
27: second gear train
28: other secondary toothed wheel
AX: axis
IND: reverse direction
M: motor

The invention claimed is:

1. A brake caliper of an automobile vehicle, for overlapping an outer edge of a braking disc, the caliper comprising a first pad and a second pad for being on either side of the disc to be pressed against the disc, as well as:
   a first mechanical actuator including a first movable piston and a first primary toothed wheel, the first piston resting on the first pad to press the first pad against the disc by rotating the first primary toothed wheel;
   a second mechanical actuator including a second movable piston and a second primary toothed wheel, the second piston resting on the second pad to press the second pad against the disc by rotating the second primary toothed wheel;
   a rotary shaft including a first worm gear and a second worm gear having a winding direction opposite to that of the first worm gear, the rotary shaft being translationally movable along a longitudinal direction of the rotary shaft;
   an electric motor for driving the rotary shaft;
   wherein the first worm gear is meshed in the first primary toothed wheel, and the second worm gear is meshed in the second primary toothed wheel.

2. The caliper according to claim 1, wherein the first and the second primary toothed wheels rotate about axes parallel to each other and perpendicular to the longitudinal direction of the rotary shaft.

3. The caliper according to claim 1, wherein each actuator includes a driving toothed wheel connected to the corresponding piston by a helical connection, and a gear train through which the driving toothed wheel is movably connected to one of the worm gears of the rotary shaft.

4. The caliper according to claim 3, wherein the gear train of each actuator includes the primary toothed wheel of the corresponding actuator as well as a secondary toothed wheel meshed in the corresponding primary toothed wheel and in oblique circumferential teeth of the corresponding driving toothed wheel.

5. A brake for an automobile vehicle, comprising a caliper according to claim 1, as well as a braking disc.

* * * * *